(12) United States Patent
Komiya et al.

(10) Patent No.: US 6,703,152 B2
(45) Date of Patent: Mar. 9, 2004

(54) METHOD OF OPERATING PHOSPHORIC ACID FUEL CELL

(75) Inventors: Teruaki Komiya, Asaka (JP); Masaru Iguchi, Tokyo (JP); Masahiro Ise, Asaka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 309 days.

(21) Appl. No.: 09/896,412

(22) Filed: Jun. 28, 2001

(65) Prior Publication Data

US 2002/0012823 A1 Jan. 31, 2002

(30) Foreign Application Priority Data

Jun. 29, 2000 (JP) ......................... 2000-197091

(51) Int. Cl.[7] .............................. H01M 8/04; H01M 8/08
(52) U.S. Cl. ............................. 429/24; 429/23; 429/25; 429/46
(58) Field of Search .............................. 429/13, 22, 23, 429/24, 25, 46

(56) References Cited

U.S. PATENT DOCUMENTS 5,302,471 A 4/1994 Ito et al. .................. 429/24

FOREIGN PATENT DOCUMENTS

JP 4-301375 A 10/1992

*Primary Examiner*—Patrick Ryan
*Assistant Examiner*—Thomas H. Parsons
(74) *Attorney, Agent, or Firm*—Lahive & Cockfield, LLP; Anthony A. Laurentano (57) ABSTRACT

The operating condition is set so that a phosphoric acid concentration, at which an amount of reaction product water to lower a concentration of phosphoric acid and an amount of water evaporated from phosphoric acid are equilibrated, can be not less than a reference phosphoric acid concentration to maintain desired performance, when a phosphoric acid fuel cell is operated under a condition where the reaction product water exists as liquid water. Specifically, an equilibrium phosphoric acid concentration-setting system is used to control, if necessary, gas flow rate control systems, gas temperature control systems, and pressure control systems so as to effectively prevent the performance of the phosphoric acid fuel cell and its power generation from being worsened. Accordingly, it is possible to suitably operate the phosphoric acid fuel cell at a low temperature without additional equipments.

5 Claims, 4 Drawing Sheets

METHOD OF OPERATING PHOSPHORIC ACID FUEL CELL

BACKGROUND OF THE INVENTION

1. Field of the Invention

The present invention relates to a method of operating a phosphoric acid fuel cell having an assembly including an electrolyte impregnated with phosphoric acid and interposed between an anode electrode and a cathode electrode, in which fuel gas is supplied to the anode electrode by the aid of a fuel gas supply system, while oxygen-containing gas is supplied to the cathode electrode by the aid of an oxygen-containing gas supply system.

2. Description of the Related Art

A phosphoric acid fuel cell (PAFC) as a type of fuel cells is provided with a power-generating cell (fuel cell unit). The power-generating cell is constructed such that an electrolyte electrode assembly is interposed between separators (bipolar plates). The electrolyte electrode assembly comprises an anode electrode and a cathode electrode principally composed of carbon respectively and provided opposingly on both sides of an electrolyte matrix layer composed of a polymer membrane such as polybenzimidazole impregnated with phosphoric acid as liquid electrolyte. Usually, a predetermined number of the power-generating cells are stacked and used as a fuel cell stack.

In the fuel cell, a fuel gas such as a gas principally containing hydrogen (hydrogen-containing gas), which is supplied to the anode electrode, contains hydrogen which is ionized into ion on the catalyst electrode, and the ion is moved toward the cathode electrode via the electrolyte. The electron, which is generated during this process, is extracted to an external circuit, and the electron is utilized as DC electric energy. An oxygen-containing gas, for example, a gas principally containing oxygen or air (gas containing oxygen) is supplied to the cathode electrode. Therefore, the hydrogen ion, the electron, and the oxygen are reacted with each other on the cathode electrode and, thus, water is produced.

An operating temperature of the above phosphoric acid fuel cell is set to be relatively high (about 120° C. to 190° C.). In general, a heating means such as a heater is used to warm up the phosphoric acid fuel cell until it is steadily operated. The phosphoric acid fuel cell is operated after the temperature thereof is raised to be not less than about 100° C. Accordingly, the self-heat generation caused by generating the power is utilized to raise the temperature up to 120° C. to 190° C.

While the phosphoric acid fuel cell generates the power, reaction product water exists as liquid water at a high ratio at a relatively low temperature less than 100° C. as in starting the operation. The liquid water is hardly evaporated into steam. Therefore, concentration of the phosphoric acid is lowered by the liquid water while increasing an entire amount of the aqueous solution of phosphoric acid (hereinafter generally referred to "phosphoric acid" as well). Consequently, the phosphoric acid which is over a storable amount exists in the anode electrode and the cathode electrode.

If the phosphoric acid overflows from the anode electrode and the cathode electrode as described above, the phosphoric acid flows out which is retained in the electrolyte matrix layer. The flow-out phosphoric acid passes through the fuel gas flow passage and the oxygen-containing gas flow passage and is discharged out of a main body of the phosphoric acid fuel cell. Then, it is impossible for the phosphoric acid fuel cell to maintain an initial performance when it ceases operating and is restarted. As a result, there is a problem that the performance of the phosphoric acid fuel cell is worsened.

Further, if the phosphoric acid overflows in the anode electrode and the cathode electrode, an activity of the catalyst to facilitate the reaction necessary for generating the power is lowered in some cases. In addition, the fuel gas flow passage and the oxygen-containing gas flow passage are closed, thereby making it difficult to flow the reaction gas (fuel gas and/or oxygen-containing gas). As a result, there is a problem that the performance of generating the power is lowered.

If the phosphoric acid is flown out, it is assumed to use a separate apparatus for replenishing the phosphoric acid to prevent the performance from being worsened.

However, there is a problem that a size of the fuel cell system becomes inevitably large in its entirety.

It is also assumed to use a heater of a large size to quickly raise the temperature of the phosphoric acid fuel cell to be not less than 100° C. However, there is the same problem as described above that the size of the fuel cell system becomes inevitably large in its entirety. In addition, it is not economic to use the heater of a large size.

SUMMARY OF THE INVENTION

A principal object of the present invention is to provide a method of operating a phosphoric acid fuel cell, which makes it possible to reliably prevent reaction product water from worsening the performance of the phosphoric acid fuel cell, by using a simple arrangement and control without large equipments.

In the method of operating a phosphoric acid fuel cell according to the present invention, the operating condition is set so that a phosphoric acid concentration, at which an amount of reaction product water to lower a concentration of phosphoric acid and an amount of water evaporated from phosphoric acid are equilibrated, can be not less than a reference phosphoric acid concentration to successfully maintain desired performance, when the phosphoric acid fuel cell is operated under a condition in which the reaction product water exists as liquid water.

Usually, the phosphoric acid, which is used for the phosphoric acid fuel cell, is obtained by dissolving diphosphorus pentoxide in water. Especially, the high concentration phosphoric acid, which is used for the phosphoric acid fuel cell, is highly hygroscopic, and it tends to mix with water highly easily. In this case, the vapor component of the phosphoric acid, i.e., the vapor component of the aqueous phosphoric acid solution is diphosphorus pentoxide (exactly a dimer) and water. However, the vapor pressure of diphosphorus pentoxide is greatly low up to a temperature in the vicinity of 200° C. Therefore, although the vapor component of the phosphoric acid is substantially occupied by water, the vapor pressure of the phosphoric acid is different from that of water.

Figure 1:
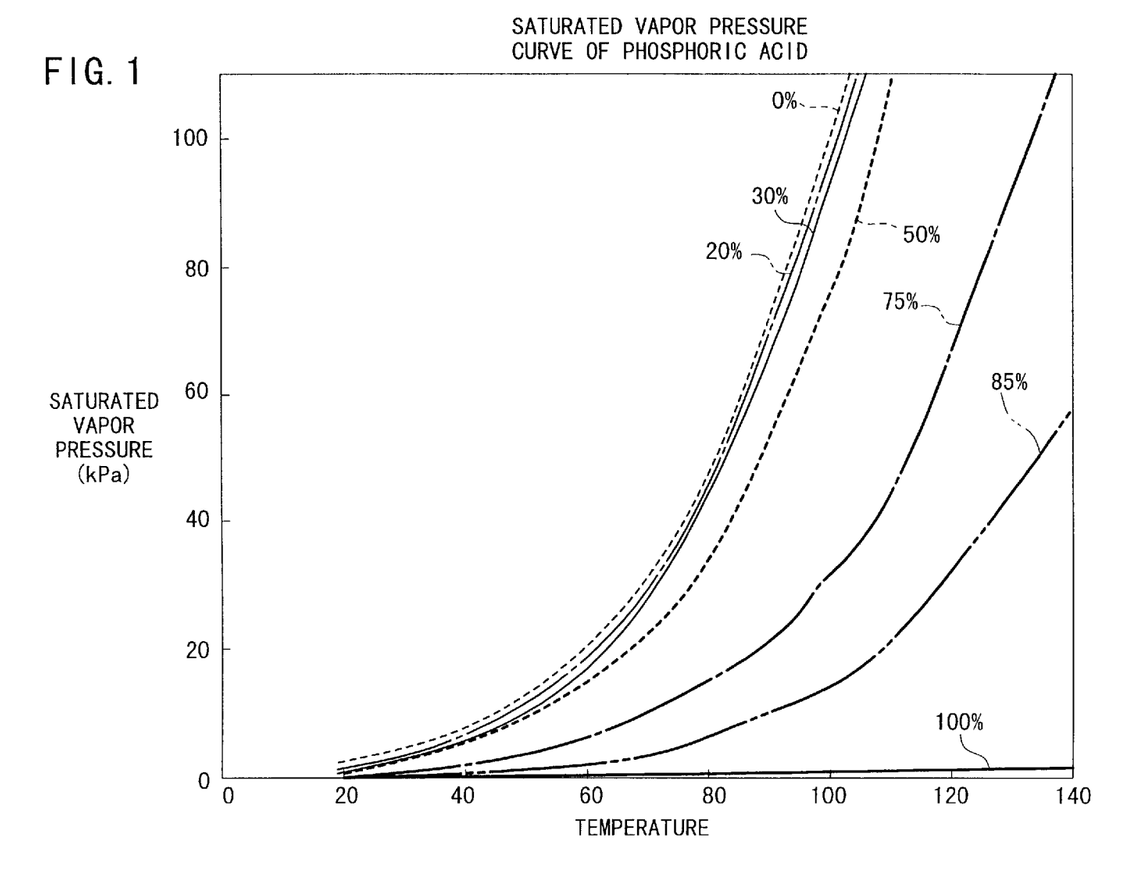
FIG. 1 shows a diagram illustrating the relationship between the temperature of phosphoric acid and the saturated vapor pressure at respective phosphoric acid concentrations.

Specifically, the relationship between the saturated vapor pressure and the temperature of the phosphoric acid in the phosphoric acid concentration is shown in a diagram of FIG. 1. The curve in FIG. 1, which resides in a phosphoric acid concentration of 0%, corresponds to the saturated vapor pressure curve of water. According to FIG. 1, the saturated vapor pressure of the phosphoric acid is greatly changed depending on the phosphoric acid concentration. The water in the phosphoric acid tends to be more evaporated as the phosphoric acid concentration is getting low. By contrast, the water in the phosphoric acid is more hardly evaporated as the phosphoric acid concentration is getting high.

When the temperature of the phosphoric acid fuel cell is lower than a usual operating temperature (about 120° C. to 190° C.) in a low output operation and at a low temperature as in starting the operation of the phosphoric acid fuel cell, the evaporating speed of the water in the phosphoric acid is slow. As a result, an amount of the product water is larger than that of the water to be evaporated. Accordingly, the phosphoric acid concentration in the electrolyte electrode assembly is lowered while the saturated vapor pressure of the phosphoric acid is increased. Thus, the water tends to evaporate.

Accordingly, the phosphoric acid concentration is lowered depending on the amount of the product water, and the amount of the product water to lower the phosphoric acid concentration and the amount of the water evaporated from the phosphoric acid arrive at the equilibrium at a certain point of time. In this state, the amount of the phosphoric acid is increased. If the amount of the phosphoric acid is larger than that of the phosphoric acid to be stored in the electrolyte electrode assembly, there is a possibility that the phosphoric acid is discharged via the fuel gas flow passage and the oxygen-containing gas flow passage out of the phosphoric acid fuel cell. As a result, the performance of the phosphoric acid fuel cell is worsened.

Accordingly, the operating condition is set so that the phosphoric acid concentration where the amount of the reaction product water to lower the concentration of the phosphoric acid and the amount of the water evaporated from the phosphoric acid are equilibrated can be not less than the reference phosphoric acid concentration. The performance including the power generation is not worsened over the reference phosphoric acid concentration. Then, the performance of the phosphoric acid fuel cell is not worsened even if the temperature thereof is low. Thus, it is possible to efficiently generate the power.

The optimal phosphoric acid concentration depends upon an internal arrangement, a size or the like of the electrolyte electrode assembly in the phosphoric acid fuel cell. Therefore, it is necessary to experimentally preset the phosphoric acid concentration where the desired performance can be maintained.

Setting of Operating Condition

If a current density is I (A/cm$^2$) and an electrode effective area is S (cm$^2$), the amount of water produced per unit time, i.e., the amount of water m (mol/min) to lower the phosphoric acid concentration is constant irrespective of the fuel gas utilization factor ra (%) and the oxygen-containing gas utilization factor rc (%), and it is determined by the following expression (1).

$$m = I \times S \times \frac{60}{96500 \times 2} \quad (1)$$

The following assumption is made. That is, the operating temperature is T ° C., the fuel gas temperature is Ta ° C., the oxygen-containing gas temperature is Tc ° C., the operating pressure on the side of the fuel gas is Pa (kPa), the operating pressure on the side of the oxygen-containing gas is Pc (kPa), the supply flow rate of the fuel gas (fuel gas flow rate) is fa (normal l/min) (provided that "normal l/min" represents the flow rate as converted into the value at 0° C., 1 atm as the normal state), the supply flow rate of the oxygen-containing gas (oxygen-containing gas flow rate) is fc (normal l/min), the flow rate of the gas discharged from the side of the fuel gas is fea (normal l/min), the flow rate of the gas discharged from the side of the oxygen-containing gas is fec (normal l/min), the ratio of the amount of water evaporated from the side of the fuel gas, of the water to lower the phosphoric acid concentration is a (%), and the ratio of the amount of water evaporated from the side of the oxygen-containing gas, of the water to lower the phosphoric acid concentration is 1-a (%).

The flow rate fea of the gas discharged from the side of the fuel gas is the sum of the flow rate of the fuel gas that is not consumed by the power generation and the amount of steam evaporated on the side of the fuel gas, of the amount of water to lower the phosphoric acid concentration (as determined by the following expression (2)).

$$fea = fa \times \frac{100 - ra}{100} + m \times \frac{a}{100} \times 22.4 \quad (2)$$

Accordingly, when the fuel gas temperature Ta ° C. and the oxygen-containing gas temperature Tc ° C. are equal to the operating temperature T ° C., the saturated vapor pressure Ps, a of the phosphoric acid in the discharged fuel gas, which is obtained at the point of time at which the amount of product water to lower the phosphoric acid concentration and the amount of water evaporated from the phosphoric acid are equilibrated, is determined by the following expression (3).

$$Ps, a = \frac{m \times \frac{a}{100} \times 22.4}{fea} \times Pa \quad (3)$$
$$= \frac{m \times \frac{a}{100} \times 22.4}{fa \times \frac{100 - ra}{100} + m \times \frac{a}{100} \times 22.4} \times Pa$$

By contrast, the flow rate fec of the gas discharged on the side of the oxygen-containing gas (which is the air containing 21 wt % of oxygen and 79 wt % of nitrogen) is determined by the following expression (4).

$$fec = fc \times \left(0.21 \times \frac{100 - rc}{100} + 0.79\right) + m \times \frac{100 - a}{100} \times 22.4 \quad (4)$$

Further, the saturated vapor pressure Ps, c of the phosphoric acid in the discharged oxygen-containing gas is similarly determined by the following expression (5).

$$Ps, c = \frac{m \times \frac{100 - a}{100} \times 22.4}{fec} \times Pc \quad (5)$$
$$= \frac{m \times \frac{100 - a}{100} \times 22.4}{fc \times \left(0.21 \times \frac{100 - rc}{100} + 0.79\right) + m \times \frac{100 - a}{100} \times 22.4} \times Pc$$

Figure 2:
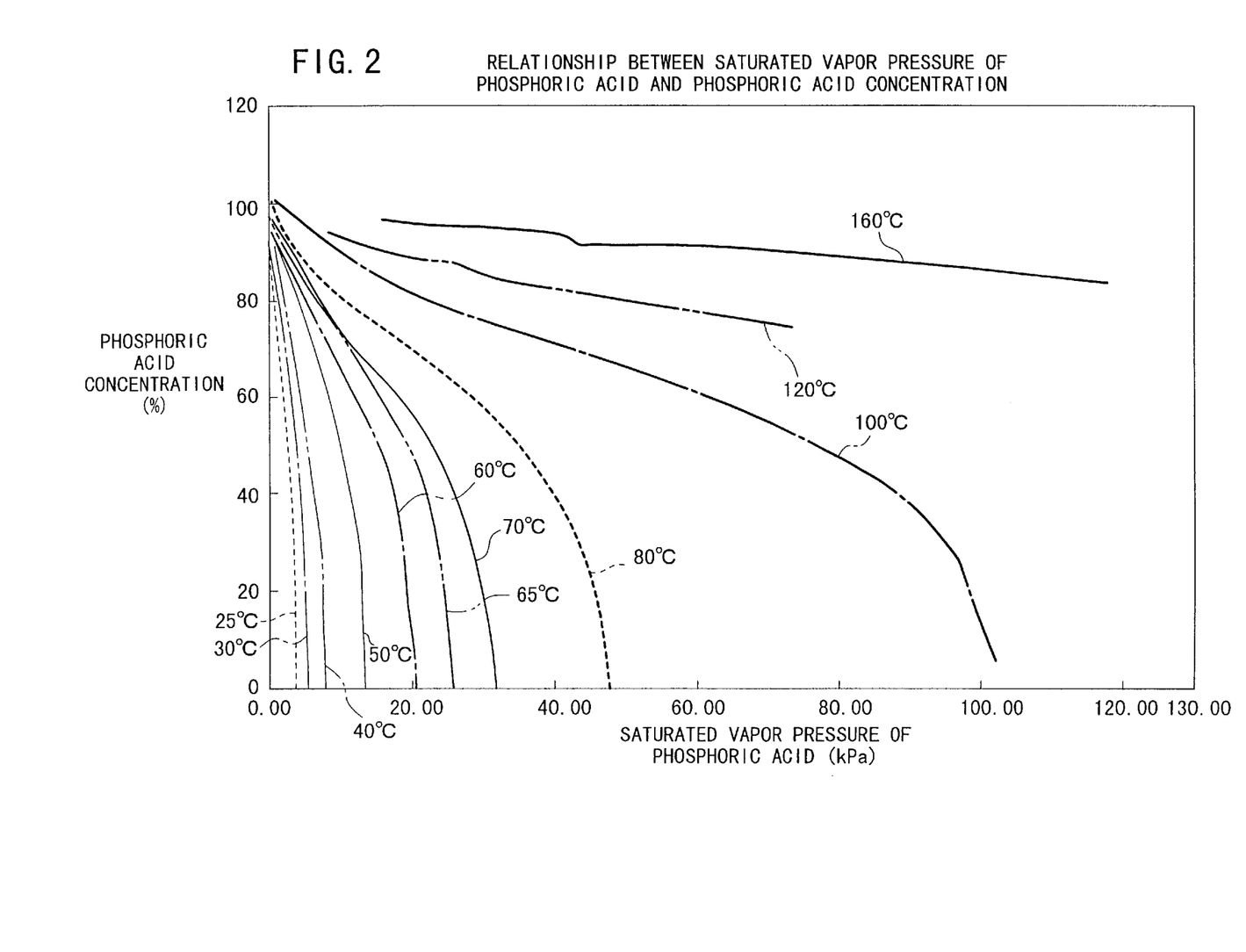
FIG. 2 shows a diagram illustrating the relationship between the saturated vapor pressure of phosphoric acid and the phosphoric acid concentration.

The relationship between the saturated vapor pressure of the phosphoric acid and the phosphoric acid concentration is shown in a diagram in FIG. 2. The concentration of the phosphoric acid at the temperature T ° C. is determined as a function of the saturated vapor pressure of the phosphoric acid. As clearly understood from FIG. 2, at a certain operating temperature T ° C., the lower the saturated vapor pressure of the phosphoric acid is, the higher the phosphoric acid concentration is. Therefore, the phosphoric concentration, at which the amount of the product water to lower the phosphoric acid concentration and the amount of the water evaporated from the phosphoric acid are equilibrated at the operating temperature T ° C., can be determined by using the saturated vapor pressure Ps, a of the phosphoric acid in the discharged fuel gas and the saturated vapor pressure Ps, c of the phosphoric acid in the oxygen-containing gas respectively.

Specifically, the saturated vapor pressure Ps, a of the phosphoric acid in the discharged fuel gas is a function of the operating pressure Pa on the side of the fuel gas and the flow rate fea of the gas discharged from the side of the fuel gas. The flow rate fea of the discharged fuel gas described above is a function of the amount of the water m to lower the phosphoric acid concentration and the utilization factor ra of the fuel gas. If m is constant, the lower the utilization factor ra of the fuel gas is, the larger the flow rate fea of the discharged fuel gas. Therefore, the saturated vapor pressure Ps, a of the phosphoric acid in the discharged fuel gas is low when the operating pressure Pa on the fuel gas side is low or when the utilization factor ra of the fuel gas is low. As a result, the phosphoric acid concentration is increased.

Similarly, the saturated vapor pressure Ps, c of the phosphoric acid in the discharged oxygen-containing gas is a function of the operating pressure Pc on the oxygen-containing gas side, the utilization factor rc of the oxygen-containing gas, and the flow rate fc of the oxygen-containing gas as converted into the value at 0° C., 1 atm as a normal state. Therefore, the saturated vapor pressure Ps, c of the phosphoric acid in the discharged oxygen-containing gas is low when the operating pressure Pc on the oxygen-containing gas side is low or when the utilization factor rc of the oxygen-containing gas is low. As a result, the phosphoric acid concentration is increased.

Accordingly, by setting the utilization factor ra of the fuel gas and the utilization factor rc of the oxygen-containing gas and/or the operating pressure Pa on the fuel gas side and the operating pressure Pc on the oxygen-containing gas side, the phosphoric acid concentration, at which the amount of the product water to lower the phosphoric acid concentration and the amount of the water evaporated from the phosphoric acid are equilibrated, is not less than the reference phosphoric acid concentration. Over the reference phosphoric acid concentration, the performance is not worsened, i.e., the desired performance can be maintained. Thus, it is possible to reliably prevent the performance from being worsened even in the operation at a low temperature.

By contrast, the phosphoric acid concentration is determined as the function of the saturated vapor pressure of the phosphoric acid and the temperature (see FIG. 2). Therefore, when the saturated vapor pressure of the phosphoric acid is constant, it is possible to increase the phosphoric acid concentration at the equilibrium if the temperature, at which the amount of the product water to lower the phosphoric acid concentration and the amount of the water evaporated from the phosphoric acid are equilibrated, is set to be high.

That is, the phosphoric acid temperature T ° C. at the equilibrium interface, at which the amount of the product water to lower the phosphoric acid concentration and the amount of the water evaporated from the phosphoric acid are equilibrated, is made to be higher than the operating temperature T ° C. by making the fuel gas temperature Ta ° C. and the oxygen-containing gas temperature Tc ° C. to be higher than the operating temperature T ° C. Thus, the phosphoric acid concentration at the equilibrium can be made to be high. The relationship between the fuel gas temperature Ta ° C. and the oxygen-containing gas temperature Tc ° C. and the phosphoric acid temperature T" ° C. at the equilibrium interface is inherent in the concerning phosphoric acid fuel cell, which is desirably determined experimentally beforehand.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 3:
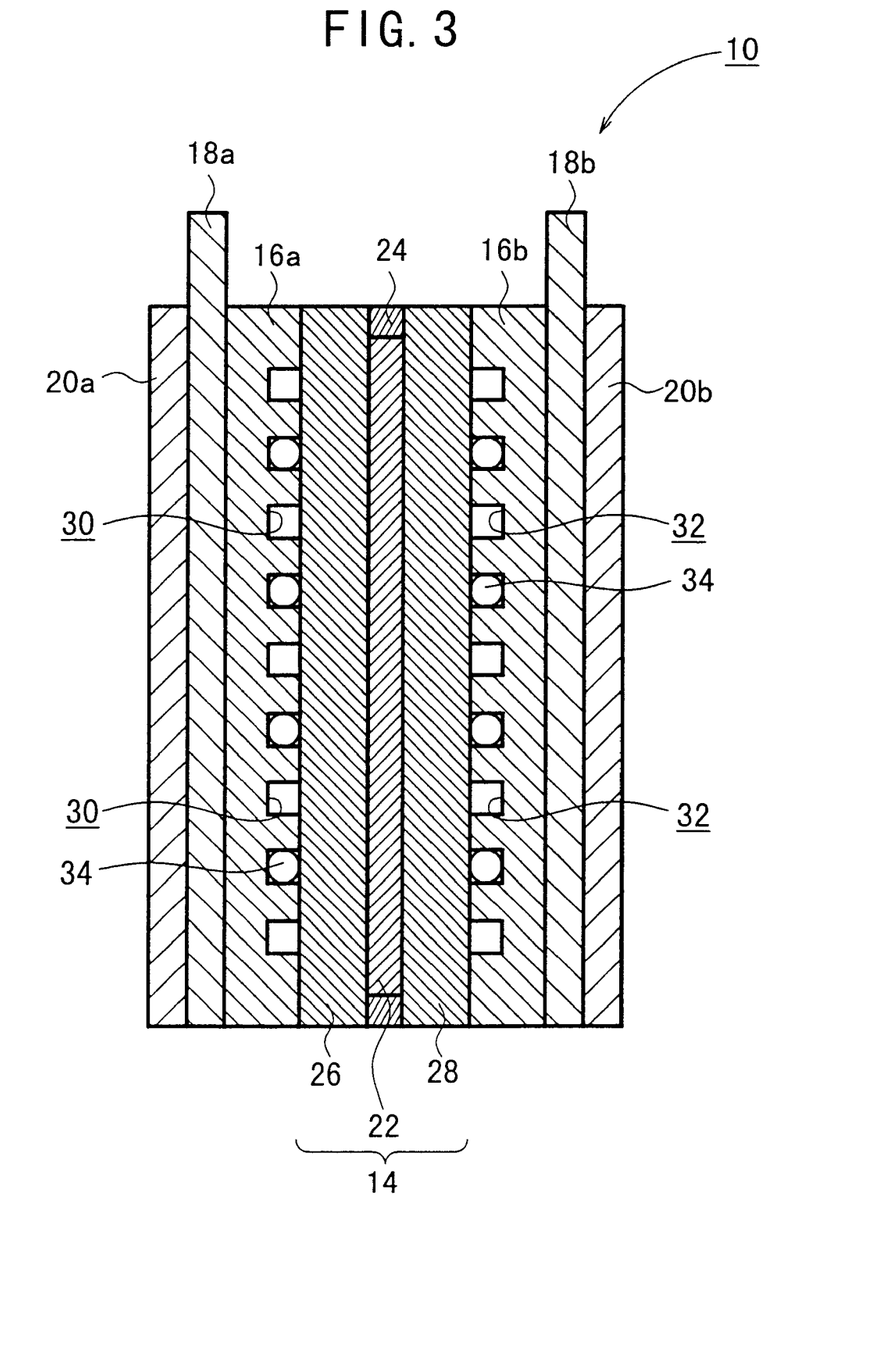
FIG. 3 illustrates an arrangement of a phosphoric acid fuel cell for carrying out the operating method according to the present invention.
Figure 4:
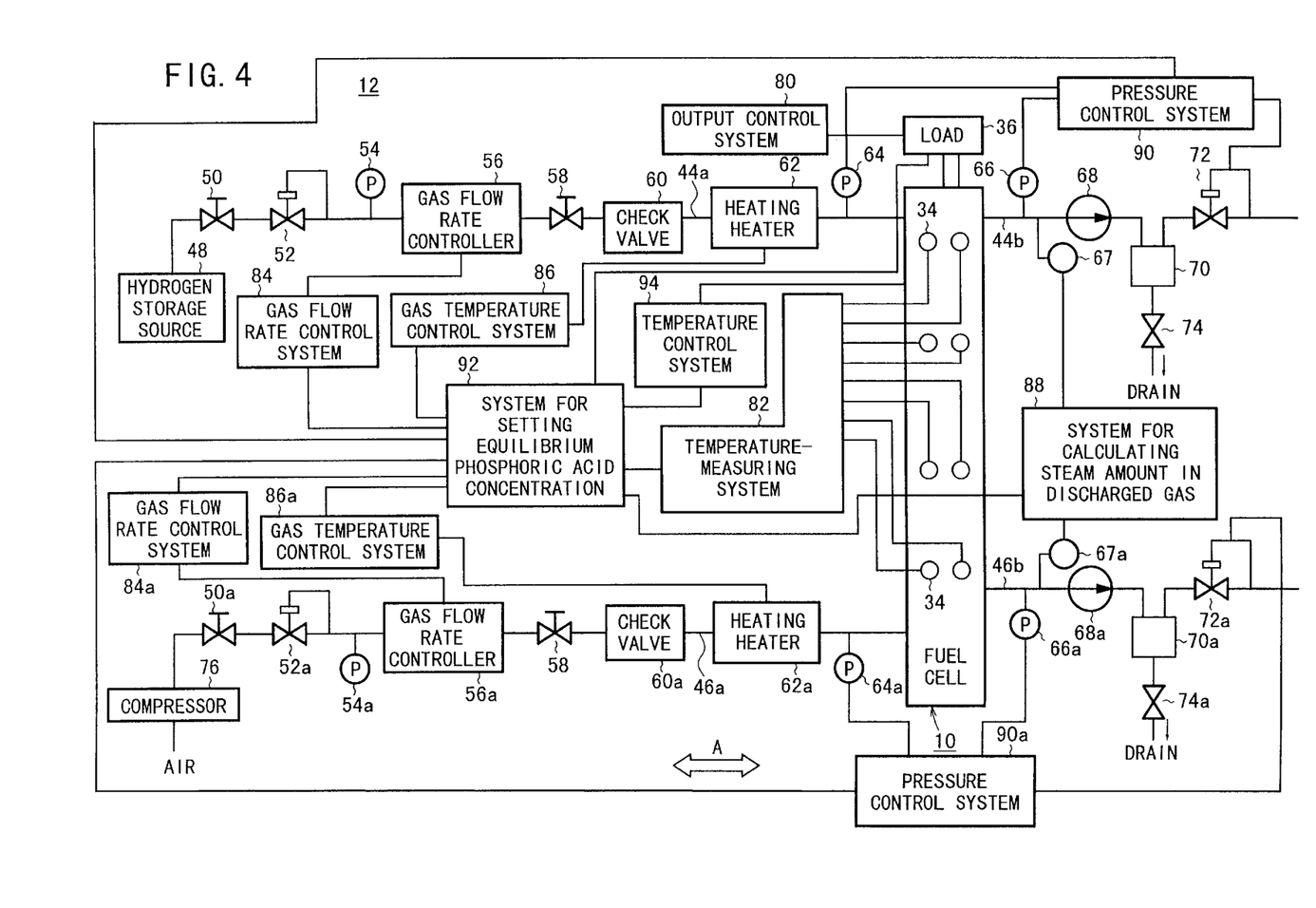
FIG. 4 shows a schematic arrangement of a fuel cell system into which the phosphoric acid fuel cell is incorporated.

FIG. 3 illustrates an arrangement of a phosphoric acid fuel cell 10 for carrying out the operating method according to an embodiment of the present invention, and FIG. 4 shows a schematic arrangement of a fuel cell system 12 into which the phosphoric acid fuel cell 10 is incorporated.

As shown in FIG. 3, the phosphoric acid fuel cell 10 comprises an electrolyte electrode assembly 14, separators 16a, 16b which are bipolar plates arranged on both surfaces of the electrolyte electrode assembly 14, and collecting electrodes 18a, 18b which are arranged at the outside of the separators 16a, 16b. End plates 20a, 20b are arranged at the outside of the collecting electrodes 18a, 18b. The end plates 20a, 20b are tightened by the aid of unillustrated bolts, and thus the phosphoric acid fuel cell 10 is integrally constructed.

The electrolyte electrode assembly 14 comprises an electrolyte matrix layer 22 which includes a polymer membrane such as a membrane of basic polymer, for example, polybenzimidazole impregnated with phosphoric acid, and an anode electrode 26 and a cathode electrode 28 which are provided opposingly on both surfaces of the electrolyte matrix layer 22 by the aid of a frame-shaped spacer 24.

The separators 16a, 16b are provided with a fuel gas flow passage 30 and an oxygen-containing gas flow passage 32 which are formed on surfaces opposed to the anode electrode 26 and the cathode electrode 28. A plurality of temperature sensors 34 are arranged for the separators 16a, 16b corresponding to boundary surfaces of the anode electrode 26 and the cathode electrode 28.

As shown in FIG. 4, a load 36 such as a motor is connected to the collecting electrodes 18a, 18b of the phosphoric acid fuel cell 10. The phosphoric acid fuel cell is connected with a fuel gas supply passage 44a and a fuel gas discharge passage 44b which communicate with the fuel gas flow passage 30, and an oxygen-containing gas supply passage 46a and an oxygen-containing gas discharge passage 46b which communicate with the oxygen-containing gas flow passage 32.

The fuel gas supply passage 44a is arranged with a hydrogen storage source 48 for supplying the hydrogen-containing gas as the fuel gas at a high pressure, a solenoid-operated valve 50, a pressure-reducing valve 52, a pressure sensor 54, a gas flow rate controller 56, a shut off valve 58, a check valve 60, a heating heater 62, and an inlet side pressure sensor 64 which are disposed in a direction from an upstream side toward an inlet side of the phosphoric acid fuel cell 10. The fuel gas discharge passage 44b is arranged with an outlet side pressure sensor 66, a dew point sensor 67, a heat exchanger 68, a gas/liquid separator 70, and a back pressure valve 72. Further, a solenoid-operated valve 74 is provided on the outlet side of the gas/liquid separator 70.

The oxygen-containing gas supply passage 46a and the oxygen-containing gas discharge passage 46b are constructed in the same manner as the fuel gas supply passage 44a and the fuel gas discharge passage 44b described above. The same components are designated by the same reference numerals affixed with a symbol "a", detailed explanation of which will be omitted. A compressor 76 for supplying the air as the oxygen-containing gas is arranged on the upstream side of the oxygen-containing gas supply passage 46a.

An output control system 80 is connected to the load 36. The plurality of temperature sensors 34, which are incorporated into the phosphoric acid fuel cell 10, are connected to a temperature-measuring system 82. Gas flow rate control systems 84, 84a are connected to the gas flow rate controllers 56, 56a. Gas temperature control systems 86, 86a are connected to the heating heaters 62, 62a. A system 88 for calculating the steam amount in the discharged gas is connected to the dew point sensors 67, 67a. Pressure control systems 90, 90a are connected to the inlet side pressure sensors 64, 64a, the outlet side pressure sensors 66, 66a, and the back pressure valves 72, 72a.

The temperature-measuring system 82 is connected to a system 92 for setting the equilibrium phosphoric acid concentration. The system 92 for setting the equilibrium phosphoric acid concentration is connected with the load 36, the gas flow rate control systems 84, 84a, the gas temperature control systems 86, 86a, the system 88 for calculating the steam amount in the discharged gas, the pressure control systems 90, 90a, and the temperature control system 94.

The operation of the fuel cell system 12 incorporated with the phosphoric acid fuel cell 10 will now be explained.

The hydrogen-containing gas at a high pressure is supplied from the hydrogen storage source 48 on the side of the fuel gas supply passage 44a. After the pressure is reduced into a maximum value pressure of the operating pressure by the aid of the pressure-reducing valve 52, the gas utilization factor is controlled by the gas flow rate controller 56. The temperature of the hydrogen-containing gas is raised to a predetermined temperature by the aid of the heating heater 62, and then the pressure is adjusted to be a predetermined operating pressure by controlling the back pressure valve 72. The hydrogen-containing gas is introduced into the fuel gas flow passage 30 which is provided for the separator 16a on the side of the anode electrode 26 of the phosphoric acid fuel cell 10.

The hydrogen-containing gas is supplied to the fuel gas flow passage 30, and an amount of hydrogen gas, which is prescribed by the gas utilization factor, is diffused into the anode electrode 26. The hydrogen gas is consumed by the catalytic reaction in the catalyst layer to contribute to the power generation. The remaining hydrogen-containing gas is discharged to the side of the fuel gas discharge passage 44b, while containing an amount of water discharged from the fuel gas side, of the product water to lower the phosphoric acid concentration.

By contrast, the oxygen-containing gas such as the air is highly pressurized by the compressor 76 on the side of the oxygen-containing gas supply passage 46a. Next, the air pressure is reduced into a maximum value pressure of the operating pressure by the aid of the pressure-reducing valve 52a. The air passes through the gas flow rate controller 56a to control the gas utilization factor, and then the temperature of the air is raised to a preset temperature by the aid of the heating heater 62a.

Further, the air is adjusted to have a predetermined operating pressure by controlling the back pressure valve 72a. The air is introduced into the oxygen-containing gas flow passage 32 which is formed for the separator 16b on the side of the cathode electrode 28 of the phosphoric acid fuel cell 10. The air is supplied to the oxygen-containing gas flow passage 32. An amount of the air prescribed by the gas utilization factor is diffused into the cathode electrode 28, and it is consumed by the catalytic reaction in the catalyst layer to contribute to the power generation. The remaining air passes through the oxygen-containing gas flow passage 32, and it is discharged to the oxygen-containing gas discharge passage 46b, while containing an amount of water discharged from the oxygen-containing gas side, of the lot product water to lower the phosphoric acid concentration.

In this arrangement, the output control system 80 determines the necessary current value, from the required output at the concerning point of time. The amount of electron, which flows through the closed circuit composed of the phosphoric acid fuel cell 10 and the load 36, is determined on the basis of the current value. The amounts of the fuel gas and the oxygen-containing gas to be consumed are determined depending on the amount of electron flowing through the closed circuit, and thus the amount of product water m (mol/min) to lower the phosphoric acid concentration is determined.

Subsequently, the dew points of the fuel gas and the oxygen-containing gas to be discharged are detected by the dew point sensors 67, 67a which are connected to the outlet side of the phosphoric acid fuel cell 10. The dew point data is sent to the system 88 for calculating the steam amount in the discharged gas. The system 88 for calculating the steam amount in the discharged gas calculates the amount of water originating from the phosphoric acid discharged to the fuel gas side and the amount of water originating from the phosphoric acid discharged to the oxygen-containing gas side. Further, the ratio a (%) of water evaporated from the fuel gas side is calculated in the amount of water to lower the phosphoric acid concentration. The ratio a (%) is sent to the system 92 for setting the equilibrium phosphoric acid concentration.

By contrast, the operating temperature of the phosphoric acid fuel cell 10 is detected by the temperature-measuring system 82 by the aid of the plurality of temperature sensors 34 arranged in the phosphoric acid fuel cell 10. The minimum value of the detected temperatures is sent, as the operating temperature T ° C. of the phosphoric acid fuel cell 10, to the system 92 for setting the equilibrium phosphoric acid concentration.

The system 92 for setting the equilibrium phosphoric acid concentration is inputted with the amount of product water m (mol/min) to lower the phosphoric acid concentration and the ratio a (%) of evaporation from the fuel gas side of the amount of water to lower the phosphoric acid concentration. When the operating temperature of the phosphoric acid fuel cell 10 is T ° C., the fuel gas utilization factor ra, the oxygen-containing gas utilization factor rc, the operating pressure Pa on the fuel gas side, the operating pressure Pc on the oxygen-containing gas side, the fuel gas temperature Ta ° C., the oxygen-containing gas temperature Tc ° C. are set, if necessary, so that the phosphoric acid concentration, at which the amount of product water to lower the phosphoric acid concentration and the amount of water evaporated from the phosphoric acid are equilibrated, can be not less than the reference phosphoric acid concentration. Over the reference phosphoric acid concentration, the inherent performance of the phosphoric acid fuel cell 10 is not worsened.

The preset fuel gas utilization factor ra is sent to the gas flow rate control system 84 on the fuel gas side. The gas flow rate control system 84 sets the necessary fuel gas flow rate from the fuel gas utilization factor ra and the amount of the fuel gas consumed by the reaction to control the flow rate of the fuel gas by the aid of the gas flow rate controller 56. Similarly, the preset oxygen-containing gas utilization factor rc is sent to the gas flow rate control system 84a on the oxygen-containing gas side. The gas flow rate control system 84a sets the necessary oxygen-containing gas flow rate from the oxygen-containing gas utilization factor rc and the amount of the oxygen-containing gas consumed by the reaction to control the flow rate of the oxygen-containing gas by the aid of the gas flow rate controller 56a.

The preset operating pressure Pa on the fuel gas side is sent to the pressure control system 90 on the fuel gas side. The inlet side pressure or the outlet side pressure of the phosphoric acid fuel cell 10 is controlled to be the preset value by adjusting the back pressure valve 72. Similarly, the preset operating pressure Pc on the oxygen-containing gas side is sent to the pressure control system 90a on the oxygen-containing gas side. The inlet side pressure or the outlet side pressure of the phosphoric acid fuel cell 10 is controlled to be the preset value by adjusting the back pressure valve 72a.

Further, the present fuel gas temperature Ta ° C. is sent to the gas temperature control system 86 on the fuel gas side. The fuel gas is controlled to have the preset value by the aid of the heating heater 62. Similarly, the present oxygen-containing gas temperature Tc ° C. is sent to the gas temperature control system 86a on the oxygen-containing gas side. The oxygen-containing gas is controlled to have the preset value by the aid of the heating heater 62a.

At the minimum operating temperature where the performance of the phosphoric acid fuel cell 10 is not worsened, the operating conditions are stored previously. In other words, the current density, the operating temperature of the phosphoric acid fuel cell, the fuel gas temperature, the oxygen-containing gas temperature, the fuel gas utilization factor, the oxygen-containing gas utilization factor, and the ratio of evaporation from the fuel gas side of the amount of water to lower the phosphoric acid concentration are stored previously. The operation of the phosphoric acid fuel cell 10 is started based on the above stored conditions after the temperature is raised to the minimum operating temperature where the performance is not worsened.

As described above, in the embodiment of the present invention, when the phosphoric acid fuel cell 10 is operated in the temperature range less than 120° C. or in the low output operation state, even if the existing ratio of the reaction product water as the liquid water is high, and the concentration of the phosphoric acid is lowered while increasing the amount of the phosphoric acid, then the operating condition is set so that the phosphoric acid concentration, at which the amount of product water to lower the phosphoric acid concentration and the amount of water evaporated from the phosphoric acid are equilibrated, is not less than the reference phosphoric acid concentration. Over the reference phosphoric acid concentration, the performance of the phosphoric acid fuel cell 10 is not worsened (i.e., the desired performance thereof can be maintained). Accordingly, it is not necessary to use additional equipments such as a heater of a large size and a separate apparatus for replenishing the phosphoric acid. The performance of the power generation and the phosphoric acid fuel cell 10 is prevented from being worsened or lowered by a simple and economic arrangement. The power can be suitably generated by the phosphoric acid fuel cell 10 at the low temperature.

EXAMPLES

Determination of Phosphoric Acid Concentration to Prevent Inherent Performance of Phosphoric Acid Fuel Cell 10 from Being Worsened If the phosphoric acid once flows out, an initial performance of the phosphoric acid fuel cell 10 is not recovered. Therefore, the phosphoric acid concentration at the lower limit of the operating temperature is a reference phosphoric acid concentration where the initial performance can be recovered after it is operated under the condition which generates the product water to lower the phosphoric acid concentration. Over the above reference phosphoric acid concentration, the inherent performance of the phosphoric acid fuel cell 10 is prevented from being worsened.

Accordingly, the performance (current density-voltage characteristic) of the phosphoric acid fuel cell 10 was evaluated under the condition where the performance thereof is not worsened regardless of the outflow of the phosphoric acid. In other words, the performance was evaluated under the condition where the operating temperature of the phosphoric acid fuel cell 10 was 160° C., the operating pressure on the fuel gas side was 201.3 kPa, the operating pressure on the oxygen-containing gas side was 201.3 kPa, the utilization factor of the fuel gas was 50%, and the utilization factor of the oxygen-containing gas was 50%. The voltage, at which the current density was 1 A/cm$^2$, was used as a reference for the initial performance.

Subsequently, the power was continuously generated for 3 hours at a constant current density of 0.2 A/cm$^2$ under the same condition as above except that the operating temperature of the phosphoric acid fuel cell 10 was the operating temperature T ° C. lower than 160° C. The amount of water to lower the concentration of the phosphoric acid was determined from the current density and the effective electrode area. Further, the ratio a of evaporation from the fuel gas side of the amount of water to lower the concentration of the phosphoric acid was determined from the measured values of the dew point sensors 67, 67a. Next, the operating temperature was set to be 160° C. again, and the performance of the phosphoric acid fuel cell 10 was evaluated to measure the voltage at the current density of 1 A/cm$^2$.

Subsequently, the above measurement was continued while changing the condition of the operating temperature T ° C. to determine the operating temperature at which the voltage at the current density of 1 A/cm$^2$ before/after the low temperature power generation was not lowered as compared with the initial performance. As a result, the operating temperature was 120° C. The ratio a of evaporation from the fuel gas side of the amount of water to lower the phosphoric acid concentration was 20%. Further, the operating temperature T ° C. was 120° C., the current density I was 0.2 A/cm$^2$, the effective electrode area was 196 cm$^2$, the ratio a of evaporation from the fuel gas side of the amount of water to lower the phosphoric acid concentration was 20%, the fuel gas utilization factor ra was 50%, the oxygen-containing gas utilization factor rc was 50%, the fuel gas flow rate fa as converted into the value at 0° C., 1 atm as the normal state was 0.54 l/min, the oxygen-containing gas flow rate fc as converted into the value at 0° C., 1 atm as the normal state was 1.33 l/min, the operating pressure Pa on the fuel gas side was 201.3 kPa, and the operating pressure Pc on the oxygen-containing gas side was 201.3 kPa.

According to the above, the saturated vapor pressure Ps, a of the phosphoric acid in the fuel gas was 33.6 kPa, and the saturated vapor pressure Ps, c of the phosphoric acid in the oxygen-containing gas was 31.8 kPa at the point of time at which the amount of product water to lower the phosphoric acid concentration and the amount of water evaporated from the phosphoric acid were equilibrated. In this case, the phosphoric acid concentration on the fuel gas side was 84.9%, and the phosphoric acid concentration on the oxygen-containing gas side was 86.6%. Therefore, the lower limit of the phosphoric acid concentration was 84.9% where the inherent performance of the phosphoric acid fuel cell 10 was not worsened.

Operation at Operating Temperature of 80° C.

At first, conditions of the fuel gas utilization factor ra, the oxygen-containing gas utilization factor rc, the operating pressure Pa on the fuel gas side, and the operating pressure Pc on the oxygen-containing gas side were made to be the same as those in the usual operation to measure a worsened degree of the performance. Accordingly, the operating temperature of the phosphoric acid fuel cell 10 was set to be 160° C. where the performance thereof was not worsened, the operating pressure on the fuel gas side was set to be 201.3 kPa, the operating pressure on the oxygen-containing gas side was set to be 201.3 kPa, the fuel gas utilization factor was set to be 50%, and the oxygen-containing gas utilization factor was set to be 50%. Under this condition (hereinafter referred to as "reference operating condition"), the performance (current density-voltage characteristic) of the phosphoric acid fuel cell 10 (electrode effective area: 196 acm$^2$) was evaluated. The voltage at the current density of 1 A/cm$^2$ was used as the initial performance reference value.

Subsequently, the conditions of the operating pressure on the oxygen-containing gas side (201.3 kPa), the fuel gas utilization factor (50%), and the oxygen-containing gas utilization factor (50%) were made to be the same, and the operating temperature was lowered to 80° C. while generating the power under the condition where the current density was 0.2 A/cm$^2$. In this state, the power was continuously generated for 3 hours. The ratio of evaporation from the fuel gas side of the amount of water to lower the phosphoric acid concentration was 50%.

After the power was generated for 3 hours, the performance of the phosphoric acid fuel cell 10 was evaluated under the reference operating condition based on the above initial performance. The voltage at the current density of 1 A/cm$^2$ was measured. The obtained value was compared with the initial performance reference value. As a result, a ratio of retaining the voltage was 78%. The phosphoric acid fuel cell 10 failed to recover the initial performance and the performance thereof was worsened.

Subsequently, it was investigated whether the performance of the phosphoric acid fuel cell 10 was worsened or not if the fuel gas utilization factor ra, the oxygen-containing gas utilization factor rc, the operating pressure Pa on the fuel gas side, and the operating pressure Pc on the oxygen-containing gas side were made to be lower than those used in the usual operation. Specifically, the operating temperature of the phosphoric acid fuel cell 10 was 80° C., the current density was 0.2 A/cm$^2$, the electrode effective area was 196 cm$^2$, and the ratio of evaporation from the fuel gas side of the amount of water to lower the initial phosphoric acid concentration was 50% to determine the combination of the fuel gas utilization factor ra, the oxygen-containing gas utilization factor rc, the operating pressure Pa on the fuel gas side, and the operating pressure Pc on the oxygen-containing gas side so that the phosphoric acid concentration could be not less than 84.9% as the lower limit of the reference phosphoric acid concentration where the performance was not worsened.

In the phosphoric acid having the phosphoric acid concentration of 84.9%, the saturated vapor pressure at 80° C. is 6.10 kPa. The condition was set so that the saturated vapor pressure of the phosphoric acid could be not more than 6.10 kPa on the fuel gas side and the oxygen-containing gas side. That is, when the operating pressure Pa on the fuel gas side and the operating pressure Pc on the oxygen-containing gas side are 101.3 kPa as the minimum value (atmospheric pressure) on the outlet side pressure respectively, the sufficient fuel gas utilization factor ra is not more than 11% and the sufficient oxygen-containing gas utilization factor rc is not more than 14%. For example, the fuel gas utilization factor ra was set to be 10%, and the oxygen-containing gas utilization factor rc was set to be 10%.

As described above, the initial performance reference value was obtained based on the reference operating condition which did not worsen the performance. Next, the operating pressure Pa on the fuel gas side and the operating pressure Pc on the oxygen-containing gas side were 101.3 kPa as the outlet side pressure respectively. The power was generated under the condition where the fuel gas utilization factor ra was 10%, the oxygen-containing gas utilization factor rc was 10%, and the current density was 0.2 A/cm$^2$, and the operating temperature was lowered to 80° C.

After the power was continuously generated for 3 hours without changing the operating condition, the performance of the phosphoric acid fuel cell 10 (current density-voltage characteristic) was evaluated under the reference operating condition as a reference for the initial performance to measure the voltage at the current density of 1 A/cm$^2$. When the obtained value was compared with the initial performance reference value, the ratio of retaining the voltage was 100%. Therefore, the performance was not worsened.

Operation at Operating Temperature of 65° C.

It was investigated whether the performance of the phosphoric acid fuel cell 10 was worsened or not if the fuel gas utilization factor ra, the oxygen-containing gas utilization factor rc, the operating pressure Pa on the fuel gas side, and the operating pressure Pc on the oxygen-containing gas side were made to be lower than those used in the usual operation. The operating temperature of the phosphoric acid fuel cell 10 was 65° C., the current density was 0.2 A/cm$^2$, the electrode effective area was 196 cm$^2$, and the ratio of evaporation from the fuel gas side of the amount of water to lower the initial phosphoric acid concentration was 50% to determine the combination of the fuel gas utilization factor ra, the oxygen-containing gas utilization factor rc, the operating pressure Pa on the fuel gas side, and the operating pressure Pc on the oxygen-containing gas side so that the phosphoric acid concentration could be not less than 84.9% as the lower limit of the phosphoric acid concentration where the performance was not worsened.

In the phosphoric acid having the phosphoric acid concentration of 84.9%, the saturated vapor pressure at 65° C. is 2.8 kPa. Accordingly, in order that the saturated vapor pressure of the phosphoric acid is not more than 2.8 kPa on the fuel gas side and the oxygen-containing gas side, the sufficient fuel gas utilization factor ra is not more than 5% and the sufficient oxygen-containing gas utilization factor rc is not more than 13%, when the operating pressure Pa on the fuel gas side and the operating pressure Pc on the oxygen-containing gas side are lowered to 101.3 kPa as the minimum value (atmospheric pressure) of the outlet side pressure respectively. For example, the fuel gas utilization factor ra and the oxygen-containing gas utilization factor rc were set to be 5% respectively.

Subsequently, the performance of the phosphoric acid fuel cell 10 was evaluated under the reference operating condition which did not worsen the performance thereof, and the voltage at the current density of 1 A/cm$^2$ was used as the initial performance reference value. Subsequently, the operating temperature was lowered to 65° C. while generating the power under the condition where the operating pressure Pa on the fuel gas side and the operating pressure Pc on the oxygen-containing gas side were 101.3 kPa as the outlet side pressure, the fuel gas utilization factor ra was 5%, the oxygen-containing gas utilization factor rc was 5%, and the current density was 0.2 A/cm$^2$. After the power was continuously generated for 3 hours without changing the operating condition, the performance of the phosphoric acid fuel cell 10 (current density-voltage characteristic) was continuously evaluated under the reference operating condition to measure the voltage at the current density of 1 A/cm$^2$. When the obtained value was compared with the initial performance reference value, the ratio of retaining the voltage was 100%. Accordingly, the performance was not worsened.

Operation at Operating Temperature of 60° C.

It was investigated whether the performance of the phosphoric acid fuel cell 10 was worsened or not if the fuel gas utilization factor ra, the oxygen-containing gas utilization factor rc, the operating pressure Pa on the fuel gas side, and the operating pressure Pc on the oxygen-containing gas side were made to be lower than those used in the usual operation. The operating temperature of the phosphoric acid fuel cell 10 was 60° C., the current density was 0.2 A/cm$^2$, the electrode effective area was 196 cm$^2$, and the ratio of evaporation from the fuel gas side of the amount of water to lower the initial phosphoric acid concentration was 50% to determine the combination of the fuel gas utilization factor ra, the oxygen-containing gas utilization factor rc, the operating pressure Pa on the fuel gas side, and the operating pressure Pc on the oxygen-containing gas side so that the phosphoric acid concentration could be not less than 84.9% as the lower limit of the phosphoric acid concentration where the performance was not worsened.

In the phosphoric acid having the phosphoric acid concentration of 84.9%, the saturated vapor pressure at 60° C. is 2.2 kPa. In order that the saturated vapor pressure of the phosphoric acid is not more than 2.2 kPa on the fuel gas side and the oxygen-containing gas side, the sufficient fuel gas utilization factor ra is lowered to be not more than 4% and the sufficient oxygen-containing gas utilization factor rc is lowered to be not more than 10%, when the operating pressure Pa on the fuel gas side and the operating pressure Pc on the oxygen-containing gas side are lowered to 101.3 kPa as the minimum value (atmospheric pressure) of the outlet side pressure respectively.

In the above case, the excessively low gas utilization factor is not practical so much. The temperatures on the fuel gas side and the oxygen-containing gas side were set to be higher than the operating temperature, for example, set to be 120° C. to investigate whether or not the performance was worsened. At first, the initial performance reference value was obtained under the reference operating condition which did not worsen the performance. Next, the operating temperature was lowered to 60° C. while generating the power under the condition in which the operating pressure on the fuel gas side and the operating pressure on the oxygen-containing gas side were 101.3 kPa as the outlet side pressure, the fuel gas utilization factor ra was 5%, the oxygen-containing gas utilization factor rc was 5%, the current density was 0.2 A/cm$^2$, the fuel gas temperature was 120° C., and the oxygen-containing gas temperature was 120° C.

After the power was continuously generated for 3 hours without changing the operating condition, the performance of the phosphoric acid fuel cell 10 (current density-voltage characteristic) was continuously evaluated under the reference operating condition to measure the voltage at the current density of 1 A/cm$^2$. When the obtained value was compared with the initial performance reference value, the ratio of retaining the voltage was 100%. Accordingly, the performance was not worsened.

In the method of operating the phosphoric acid fuel cell according to the present invention, the operating condition is set so that the phosphoric acid concentration, at which the amount of reaction product water to lower the concentration of phosphoric acid and the amount of water evaporated from phosphoric acid are equilibrated, can be not less than the reference phosphoric acid concentration to successfully maintain the desired performance, when the phosphoric acid fuel cell is operated under the condition where the reaction product water exists as liquid water. Accordingly, it is possible to reliably prevent the performance of the power generation from being worsened and is possible to reliably maintain the initial performance when the phosphoric acid fuel cell is restarted. Accordingly, it is not necessary to add the equipments such as the heater of a large size and the apparatus for replenishing the phosphoric acid to the phosphoric acid fuel cell. Thus, the arrangement is effectively simplified and economic.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A method of operating a phosphoric acid fuel cell having an assembly including an electrolyte impregnated with phosphoric acid and interposed between an anode electrode and a cathode electrode, in which fuel gas is supplied to said anode electrode by the aid of a fuel gas flow passage, while oxygen-containing gas is supplied to said cathode electrode by the aid of an oxygen-containing gas flow passage, comprising setting an operating condition so that a phosphoric acid concentration, at which an amount of reaction product water to lower a concentration of phosphoric acid and an amount of water evaporated from the phosphoric acid are equilibrated, can not be less than a reference phosphoric acid concentration to maintain desired performance, when said phosphoric acid fuel cell is operated under a condition where said reaction product water exists as liquid water, and controlling said phosphoric acid concentration so as not to be less than said reference phosphoric acid concentration by setting a fuel gas utilization factor and an oxygen-containing gas utilization factor.

2. A method of operating a phosphoric acid fuel cell having an assembly including an electrolyte impregnated with phosphoric acid and interposed between an anode electrode and a cathode electrode, in which fuel gas is supplied to said anode electrode by the aid of a fuel gas flow passage, while oxygen-containing gas is supplied to said cathode electrode by the aid of an oxygen-containing gas flow passage, comprising setting an operating condition so that a phosphoric acid concentration, at which an amount of reaction product water to lower a concentration of phosphoric acid and an amount of water evaporated from the phosphoric acid are equilibrated, can not be less than a reference phosphoric acid concentration to maintain desired performance, when said phosphoric acid fuel cell is operated under a condition where said reaction product water exists as liquid water, and controlling said phosphoric acid concentration so as not to be less than said reference phosphoric acid concentration by setting an operating pressure on a side of said fuel gas and an operating pressure on a side of said oxygen-containing gas.

3. A method of operating a phosphoric acid fuel cell having an assembly including an electrolyte impregnated with phosphoric acid and interposed between an anode electrode and a cathode electrode, in which fuel gas is supplied to said anode electrode by the aid of a fuel gas flow passage, while oxygen-containing gas is supplied to said cathode electrode by the aid of an oxygen-containing gas flow passage, comprising setting an operating condition so that a phosphoric acid concentration, at which an amount of reaction product water to lower a concentration of phosphoric acid and an amount of water evaporated from the phosphoric acid are equilibrated, can not be less than a reference phosphoric acid concentration to maintain desired performance, when said phosphoric acid fuel cell is operated under a condition where said reaction product water exists as liquid water, and controlling said phosphoric acid concentration so as not to be less than said reference phosphoric acid concentration by setting a temperature on a side of said fuel gas and a temperature on a side of said oxygen-containing gas to be higher than an operating temperature.

4. A method of operating a phosphoric acid fuel cell having an assembly including an electrolyte impregnated with phosphoric acid and interposed between an anode electrode and a cathode electrode, in which fuel gas is supplied to said anode electrode by the aid of a fuel gas flow passage, while oxygen-containing gas is supplied to said cathode electrode by the aid of an oxygen-containing gas flow passage, comprising setting an operating condition so that a phosphoric acid concentration, at which an amount of reaction product water to lower a concentration of phosphoric acid and an amount of water evaporated from the phosphoric acid are equilibrated, can not be less than a reference phosphoric acid concentration to maintain desired performance, when said phosphoric acid fuel cell is operated under a condition where said reaction product water exists as liquid water, and controlling said phosphoric acid concentration so as not to be less than said reference phosphoric acid concentration by setting a fuel gas utilization factor and an oxygen-containing gas utilization factor, and an operating pressure on a side of said fuel gas and an operating pressure on a side of said oxygen-containing gas.

5. A method of operating a phosphoric acid fuel cell having an assembly including an electrolyte impregnated with phosphoric acid and interposed between an anode electrode and a cathode electrode, in which fuel gas is supplied to said anode electrode by the aid of a fuel gas flow passage, while oxygen-containing gas is supplied to said cathode electrode by the aid of an oxygen-containing gas flow passage, comprising setting an operating condition so that a phosphoric acid concentration, at which an amount of reaction product water to lower a concentration of phosphoric acid and an amount of water evaporated from the phosphoric acid are equilibrated, can not be less than a reference phosphoric acid concentration to maintain desired performance, when said phosphoric acid fuel cell is operated under a condition where said reaction product water exists as liquid water, and controlling said phosphoric acid concentration so as not to be less than said reference phosphoric acid concentration by setting a fuel gas utilization factor and an oxygen-containing gas utilization factor, and an operating pressure on a side of said fuel gas and an operating pressure on a side of said oxygen-containing gas, and setting a temperature on said side of said fuel gas and a temperature on said side of said oxygen-containing gas to be higher than an operating temperature.

* * * * *